Patented Oct. 9, 1928.

1,686,866

UNITED STATES PATENT OFFICE.

GEORG WILHELM FRIEDRICH FRANZ KNOTH, OF HAMBURG, GERMANY.

PROCESS FOR OBTAINING ALKALOIDS.

No Drawing. Application filed November 17, 1927, Serial No. 234,026, and in Germany October 11, 1926.

The invention relates to a process for obtaining alkaloids which are volatile with water vapours. Hitherto the extraction of material containing alkaloids from plants, with organic solvents was pretty tedious and defective as together with the alkaloids also various other substances present in the plants such as resins, fats, coloring and gummy substances are dissolved, which often renders the obtainment of pure alkaloids very difficult. Substantial losses of the solvent also increases the cost of the process.

In comparison with the extraction process, the distillation of the volatile alkaloids with steam gives great advantages, since most of the worthless components remain in the undistilled residue and the pure alkaloids (containing only minute quantities of non-disturbing accompanying substances) distill over, so that the isolation of the alkaloids is not difficult. However until now a process for obtaining alkaloids by means of distillation with steam has not been in commercial use. This is due to the tediousness of this process, the respective parts of the plants having only a small alkaloid content and for that reason the quantities of the material and the liquid do not render the industrial application of the process economical.

Now according to the present invention the volatile alkaloids may be obtained in a very satisfactory manner by steam distillation carried out on a continuous large scale. The present process consists in mixing in a vessel provided with an agitator, finely divided parts of the alkaloid-containing plants with the necessary quantity of water, the required chemicals and milk of lime or other alkalies to a thin homogeneous pulp. Said thin liquid pulp (which if desired may be heated by exhaust steam) is introduced into the upper part of a column apparatus either provided with partition overflow tubes and sealing caps or containing checker work or the like, whereas the steam enters in the lower part of the column in counter current with the pulp flowing downward to the bottom. In the same manner as the mash is treated in the distillation of spirit, the steam is repeatedly brought into intimate contact with the vegetable pulp. The liquid residue, entirely exhausted of alkaloid, leaves the column at the bottom while a corresponding fresh quantity of vegetable pulp is continuously introduced at the top of the column. The water vapours which leave the column at the top and carry along the volatile alkaloid are further treated in a suitable manner. These vapours may either directly be introduced into a suitable acid and the volume of the solution obtained may be reduced under normal or reduced pressure in case it is too large or may directly be condensed in a cooling apparatus. After alkalization of the solution the alkaloids may be obtained in pure condition in a known manner.

The advantages of the process consist in the great purity of the alkaloids obtained, the simple and concise plant, the easy treatment of the solutions, the automatic and continuous course of the process and the substantially perfect yield.

I claim:

1. A process of obtaining alkaloids which are volatile with water vapors characterized in stirring the finely divided plant material containing alkaloid with sufficient aqueous alkaline liquid to form a thin liquid pulp, introducing said pulp at the top of a column apparatus and leading steam in counter-current against the downwardly flowing pulp.

2. A process of obtaining alkaloids which are volatile with water vapors characterized in mixing the finely divided plant material containing alkaloid with sufficient aqueous liquid to form a thin liquid pulp, rendering the pulp alkaline, introducing said pulp at the top of a column apparatus and leading steam in counter-current against the downwardly flowing pulp.

3. A process of obtaining alkaloids which are volatile with water vapors characterized in mixing the finely divided plant material containing alkaloid with sufficient aqueous liquid to form a thin liquid pulp, introducing said pulp at the top of a column apparatus and leading steam in counter-current against the downwardly flowing pulp and passing the out-flowing steam carrying the alkaloid, into contact with an acidulated liquid, to hold the alkaloid.

In testimony whereof I affix my signature.

Dr. GEORG WILHELM FRIEDRICH FRANZ KNOTH.